United States Patent
Zehe et al.

(10) Patent No.: US 6,372,190 B1
(45) Date of Patent: Apr. 16, 2002

(54) PROCESS FOR FILLING AND EMPTYING A VESSEL CHARGED WITH FLAMMABLE AND AGGRESSIVE GAS

(75) Inventors: Lothar Zehe; Mieczyslaw Kuzma; Hartwig Rauleder, all of Rheinfelden (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 09/593,039

(22) Filed: Jun. 13, 2000

Related U.S. Application Data

(62) Division of application No. 09/373,724, filed on Aug. 13, 1999.

(30) Foreign Application Priority Data

Oct. 16, 1998 (DE) .......................................... 198 47 786

(51) Int. Cl.[7] .............................................. C01B 33/08
(52) U.S. Cl. .................... 423/342; 423/648.1; 422/236; 422/232; 422/233; 422/242; 137/614.2; 137/240
(58) Field of Search ................................ 423/342, 645, 423/648.1; 422/236, 232, 233, 242; 202/262; 414/221, 220; 137/209, 275, 614.2, 240, 575; 222/450; 141/67

(56) References Cited

U.S. PATENT DOCUMENTS

| 4,070,161 A | * | 1/1978 | Harter ......................... 48/210 |
| 4,089,429 A | * | 5/1978 | Stock et al. ............... 214/35 R |
| 4,955,989 A | * | 9/1990 | Mink ....................... 48/197 R |
| 5,066,186 A | * | 11/1991 | Shimada et al. ............ 414/221 |
| 5,176,189 A | * | 1/1993 | Perchthaler et al. .......... 141/98 |

* cited by examiner

Primary Examiner—Wayne Langel
Assistant Examiner—Edward M. Johnson
(74) Attorney, Agent, or Firm—Oblon, Spivak, McClelland, Maier & Neustadt, P.C.

(57) ABSTRACT

The present invention relates to an apparatus for the safe filling and emptying of a pressurized vessel charged with flammable and/or aggressive gas. The apparatus features an upper flap combination, an intermediate lock vessel having a flushing apparatus, and a lower flap combination. The present invention also relates to a pressurized reactor which is charged with flammable and/or aggressive gas and is equipped with a filling lock apparatus and an emptying lock apparatus for the simultaneous preparation of tetrachlorosilane, trichlorosilane and hydrogen. In addition, the present invention relates to a special process for filling and emptying such a reactor.

4 Claims, 2 Drawing Sheets

PROCESS FOR FILLING AND EMPTYING A VESSEL CHARGED WITH FLAMMABLE AND AGGRESSIVE GAS

This application is a division of application Ser. No. 09/373,724 filed Aug. 13, 1999, pending.

BACKGROUND OF THE INVENTION

1. Field of the Invention

The present invention relates to an apparatus for the safe filing or emptying of a pressurized vessel charged with flammable and/or aggressive gas. The present invention also relates to a pressurized reactor which is charged with flammable and/or aggressive gas and is equipped with a filling lock apparatus and a corresponding de-ashing lock apparatus. In addition, the present invention relates to a special process for filling and emptying such a reactor. The present invention also relates to the use of such a reactor for the simultaneous preparation of tetrachlorosilane, trichlorosilane and hydrogen by reacting silicon with hydrogen chloride.

2. Description of the Related Art

It is known that, by reacting silicon and hydrogen chloride in an exothermic reaction, tetrachlorosilane and trichlorosilane can be prepared with the simultaneous formation of hydrogen and a production of residue in the form of ash. The reaction generally takes place at a pressure up to 3 bar absolute and a temperature of 400 to 1200° C. Owing to legislative requirements, it is necessary to ensure that, in such syntheses, no aggressive, flammable or toxic substances escape from the plant.

For systems having hot, flammable or aggressive contents into which or out of which solids are predominantly continuously filled or withdrawn, there is no shut-off device which remains permanently sealed and reliable. Owing to deposits on sealing surfaces, as well as to mechanical or thermal stress of soft packings, the tightness of a shut-off valve can continue to be impaired.

BRIEF SUMMARY OF THE INVENTION

The primary object underlying the present invention is to make the above-mentioned plants able to be operated as safely as possible.

This object is achieved according to the invention in which an apparatus for filling or emptying a pressurized vessel is charged with flammable and/or aggressive gas. The apparatus features an upper flap combination, an intermediate lock vessel having a flushing apparatus, and a lower flap combination. An above average reliable mode of operation can be ensured for reactors which are operated at atmospheric pressure or under high pressure and are charged with flammable and/or aggressive gas, in particular for those reactors for the simultaneous preparation of tetrachlorosilane, trichlorosilane and hydrogen.

DETAILED DESCRIPTION OF THE PREFERRED EMBODIMENTS

Figure 1:
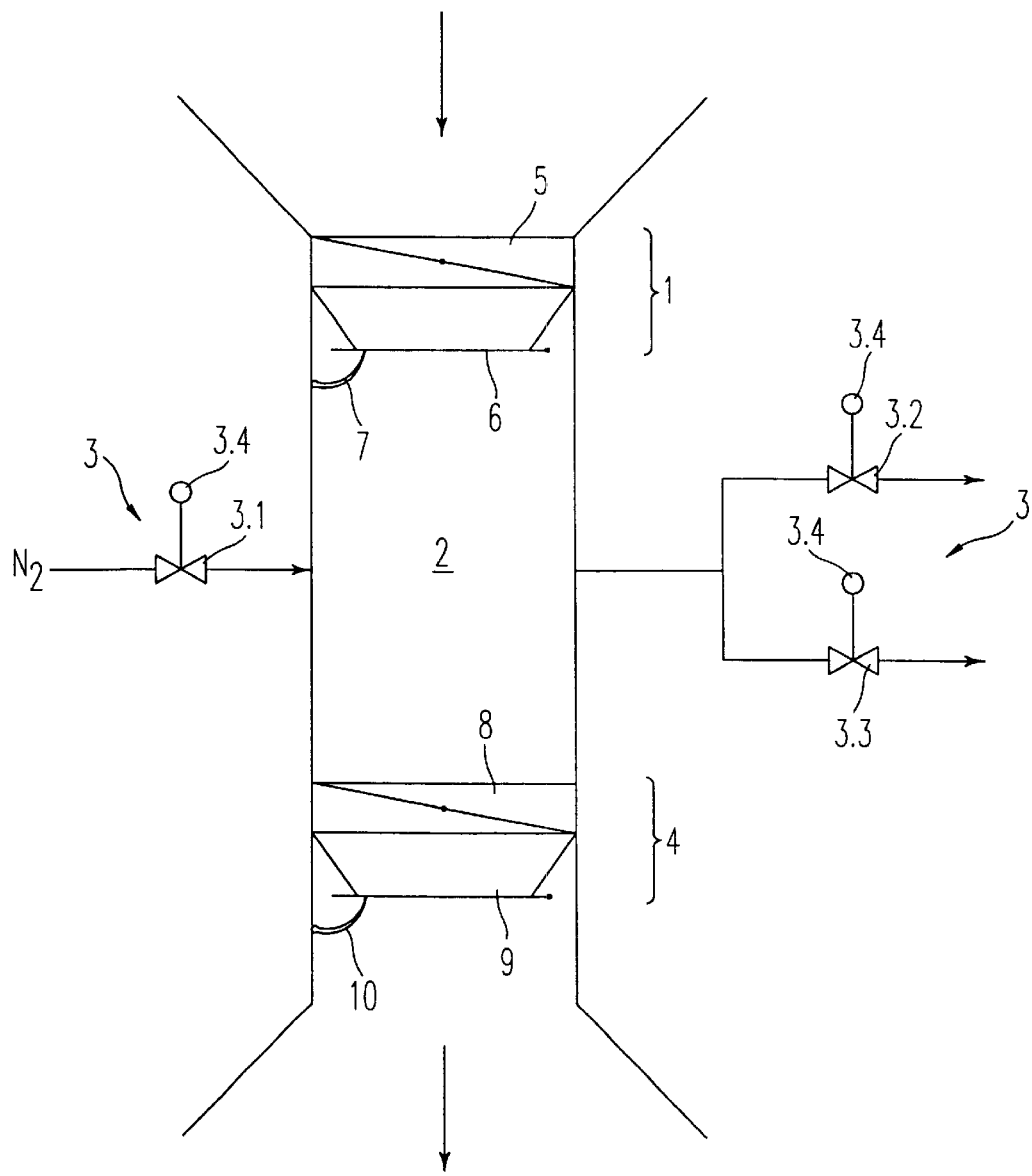
FIG. 1 shows a preferred embodiment of the apparatus according to the invention for filling or emptying a pressurized vessel charged with flammable and/or aggressive gas.

The present invention relates to an apparatus for filling and emptying a pressurized vessel charged with flammable and/or aggressive gas. As shown in FIG. 1, the apparatus features an upper flap combination 1, an intermediate lock vessel 2 having a flushing apparatus 3, and a lower flap combination 4. Preferably the flap combination 1 or 4 in each case consists of a first flap 5 or 8, a second flap 6 or 9, and a latch 7 or 10 for the second flap 6 or 9. In a suitable manner, the first flaps 5 and 8 are sealed by metallic seals.

The invention has the flushing apparatus 3 operated using preferably an inert gas, such as argon, particularly nitrogen. The flushing apparatus 3 comprises, in particular, a closeable infeed valve 3.1 for a flushing medium, a closeable outlet 3.2 for used oxygen-containing flushing medium, and a closeable outlet 3.3 for used flammable- and/or aggressive-gas-laden flushing medium. The flushing apparatus 3 also includes respective pressure and volumetric flow measuring devices 3.4.

According to the invention, such an apparatus is used advantageously as a lock system for the safe filling and emptying of a pressurized reactor charged with flammable and/or aggressive gas.

The present invention also relates to a reactor having a filling lock apparatus and a de-ashing lock apparatus. For example, in a fixed-bed reactor according to the invention which is operated in a suitable manner at a slight overpressure up to 4 bar absolute, preferably at 1.1 to 3 bar absolute, a solid, for example, lump-form or pulverulent silicon, can be reacted with a flammable and/or aggressive gas, for example, hydrogen chloride, to form a product mixture which is predominantly volatile under reaction conditions and, if appropriate, comprises further gaseous and flammable or aggressive compounds. Simultaneously, a particularly safe mode of operation can be ensured.

Figure 2:
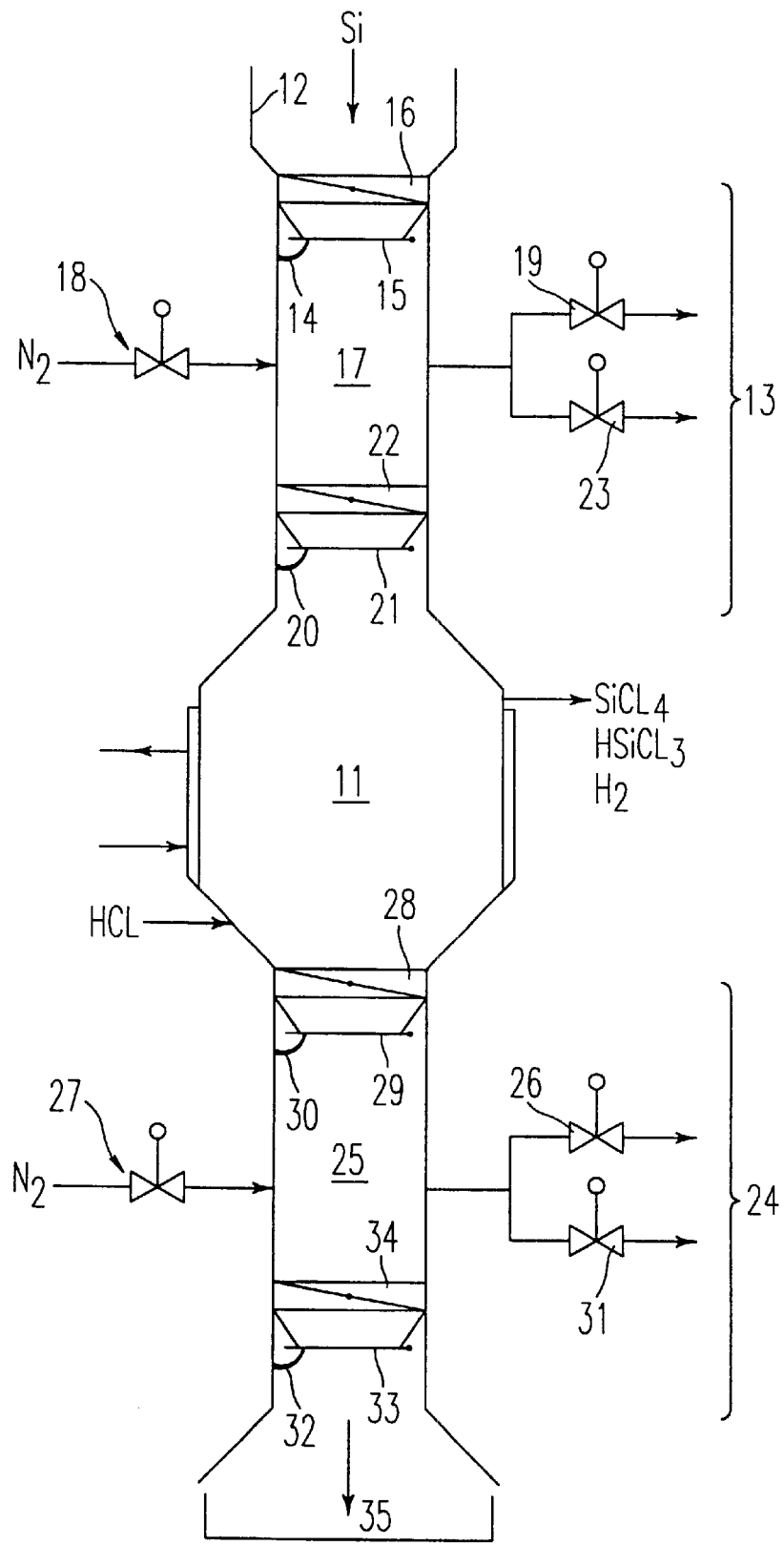
FIG. 2 shows a preferred embodiment of a reactor equipped with lock apparatuses according to the invention.

Preferably, a reactor according to the invention is used, as seen in FIG. 2, for the simultaneous preparation of tetrachlorosilane, trichlorosilane and hydrogen. Generally, in this case, downstream of the reactor, a volatile product mixture is produced and predominantly comprises tetrachlorosilane with minor constituents being trichlorosilane and hydrogen. If appropriate, traces of dichlorosilane and HCl which are condensed with high-grade hydrogen are separated off. The condensate is generally worked up by distillation.

The present invention further relates to a process for filling and emptying a pressurized reactor which is charged with flammable and/or aggressive gas via lock apparatuses.

To load a reactor 11 in FIG. 2, the operator fills a preliminary vessel 12 of a filling lock apparatus 13 with a solid starting material such as silicon and detaches a latch 14 of a second flap 15 of the upper flap combination. The operator opens the second flap 15 and then opens a first flap 16 so that the solid starting material falls into a top lock vessel 17. Subsequently, the operator closes the second flap 15, the latch 14 and the first flap 16. The top lock vessel 17 is flushed with an oxygen-free flushing medium, preferably nitrogen, by opening a flushing medium infeed valve 18 and then opening an outlet 19 for used oxygen-containing flushing medium. After flushing, the operator closes the outlet 19 and then the infeed valve 18 and tests the tightness of the actuated valves by monitoring the pressure in the top lock vessel 17.

After detaching a latch 20 of a second flap 21 on the lower flap combination of the filling lock apparatus 13, the operator opens the second flap 21 and then opens a first flap 22 so that the solid material falls therethrough for loading into the reactor 11. He then closes the second flap 21 and the first flap 22 by latching them shut. Subsequently, the top lock vessel 17 is depressurized via an outlet 23 for flammable and/or aggressive gas. Thereafter, the tightness of the actuated valves is tested by monitoring the pressure in the top lock vessel 17, in particular by checking whether pressure changes are observed.

For emptying the reactor 11, for example down an ash take-off chute 35 in FIG. 2, the operator de-ashes an emptying lock apparatus 24 and depressurizes a bottom lock vessel 25 via an outlet 26 for an oxygen-containing flushing medium after flushing the vessel 25 via infeed valve 27, preferably with nitrogen. This flushing is accomplished after closing a first flap 28 and a second flap 29, including a latch 30 of an upper flap combination of the emptying lock apparatus 24. After closing the flaps 28 and 29, the ash-charged and product-gas-charged bottom lock vessel 25 is cleared by opening the flushing medium infeed valve 27 and an outlet 31, then closing the outlet 31 and the infeed valve 27. The tightness of the actuated valves is tested by monitoring the pressure in the bottom lock vessel 25.

After detaching a latch 32 for a second flap 33 of a lower flap combination of the emptying lock apparatus 24, the operator opens the second flap 33 and then a first flap 34 for emptying the remaining solid material out of the bottom lock vessel 25. The operator then closes the second flap 33 and the first flap 34 of the lower flap combination of the emptying lock apparatus 24, latching them and again testing for tightness, in particular by checking whether any pressure changes are observed in the bottom lock vessel 25.

In the process according to the invention, the lock apparatuses 13 and 24 are preferably flushed each time after actuating the infeed valves 18 and 27 and are subsequently tested for tightness. In the event of impermissible pressure changes, the filling and emptying steps are stopped. Then, generally, in order to be able to further assure the tightness and safe operation of the plant, the actuated leaking valves and seals must be replaced.

Preferably, in the process according to the invention, silicon and hydrogen chloride are reacted to form chlorosilanes and hydrogen, in particular hydrogen having a purity of 98 to 100% so that gas of constant quality is produced. The process according to the invention is advantageously and preferably operated continuously.

Numerous modifications and variations of the present invention are possible in light of the above teachings. Thus, it is understood that, within the scope of the appended claims, the invention may be practiced otherwise than as specifically described herein.

What is claimed as new and desired to be secured by Letters Patent of the United States is:

1. A process for filling and emptying a pressurized reactor which is charged with flammable and/or aggressive gas, comprising the steps of:

loading the reactor by filling a preliminary vessel of a filling lock apparatus with solid material, detaching a latch for a second flap of an upper flap combination of the filling lock apparatus, opening the second flap and then a first flap of the filling lock apparatus so that the solid material falls into a top lock vessel, closing the second flap including the latch and the first flap of the upper flap combination of the filling lock vessel, flushing with an oxygen-free flushing medium the top lock vessel charged with the solid material, opening a flushing medium infeed valve and then opening an outlet for used oxygen-containing flushing medium, closing the outlet and then closing the infeed valve for the top lock vessel, testing tightness of the infeed valve and the outlet by monitoring pressure in the top lock vessel, detaching a latch for a second flap of a lower flap combination of the filling lock apparatus, opening the second flap and then a first flap so that the solid material falls into the reactor, closing the second flap including the latch and the first flap of the lower flap combination of the filling lock apparatus, subsequently depressurizing the top lock vessel via an outlet for flammable and/or aggressive gas, and testing tightness by monitoring pressure in the filling lock vessel; and unloading the reactor by detaching a latch for a second flap of an upper flap combination of an emptying lock apparatus, opening the second flap and then a first flap of the emptying lock apparatus so that the solid material falls into a bottom lock vessel, closing the second flap including the latch and the first flap of the upper flap combination of the emptying lock apparatus, flushing with an oxygen-free medium the bottom lock vessel charged with the solid material, opening a flushing medium infeed valve and then opening an outlet for used oxygen-containing flushing medium, closing the outlet and then closing the infeed valve for the bottom lock vessel, testing tightness of the infeed valve and the outlet by monitoring pressure in the bottom lock vessel, detaching a latch for a second flap of a lower flap combination of the emptying lock apparatus, opening the second flap and then opening a first flap so that the solid material falls down on ash take off chute, closing the second flap including the latch and the first flap of the lower flap combination of the emptying lock apparatus, subsequently depressurizing the bottom lock vessel via an outlet for flammable and/or aggressive gas, and testing tightness by monitoring pressure in the emptying lock vessel;

wherein silicon is the solid material and hydrogen chloride is charged into the reactor to form chlorosilanes and hydrogen.

2. The process as recited in claim 1, wherein the top and bottom lock apparatuses are flushed in each case after actuating a respective infeed valve and a respective actuated infeed valve is tested for tightness every time.

3. The process as recited in claim 1, wherein hydrogen has a purity of 98 to 100% so that gas of constant quality is produced.

4. The process as recited in claim 1, wherein the process is operated continuously.

* * * * *